United States Patent
Zhu

(10) Patent No.: US 7,916,779 B1
(45) Date of Patent: Mar. 29, 2011

(54) ADAPTIVE DECISION FEEDBACK EQUALIZER FOR HIGH DATA RATE SERIAL LINK RECEIVER

(75) Inventor: Xiang Zhu, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 780 days.

(21) Appl. No.: 11/858,834

(22) Filed: Sep. 20, 2007

(51) Int. Cl.
*H03H 7/30* (2006.01)

(52) U.S. Cl. .......................................... 375/229
(58) Field of Classification Search ............ 375/229
See application file for complete search history.

(56) References Cited

U.S. PATENT DOCUMENTS

| | | | |
|---|---|---|---|
| 4,669,091 A | 5/1987 | Nossen | |
| 5,768,313 A | 6/1998 | Kuribayashi | |
| 6,751,255 B1 | 6/2004 | Reuven | |
| 6,904,086 B2 | 6/2005 | Nishimura | |
| 6,928,107 B1* | 8/2005 | Olafsson et al. | 375/219 |
| 7,161,980 B2 | 1/2007 | Dittrich | |
| 7,242,711 B2 | 7/2007 | Eckhardt | |
| 7,242,712 B1 | 7/2007 | Katic | |
| 7,245,676 B2 | 7/2007 | Yui | |
| 7,590,168 B2* | 9/2009 | Raghavan et al. | 375/219 |
| 7,702,053 B2* | 4/2010 | Chen et al. | 375/348 |
| 2004/0032905 A1* | 2/2004 | Dittrich et al. | 375/233 |
| 2006/0008279 A1* | 1/2006 | Chiang et al. | 398/202 |
| 2007/0147559 A1* | 6/2007 | Lapointe | 375/350 |
| 2007/0230640 A1* | 10/2007 | Bryan et al. | 375/349 |
| 2008/0260016 A1* | 10/2008 | Lapointe et al. | 375/233 |

* cited by examiner

*Primary Examiner* — Juan A Torres
(74) *Attorney, Agent, or Firm* — Glass & Associates; Kenneth Glass; Stanley J. Pawlik

(57) ABSTRACT

An adaptive decision feedback equalizer includes a filter module, a compensation module, and a slicer module. The filter module generates a filtered signal by adaptively filtering an input serial data signal to reduce inter-symbol interference in the serial data signal. The compensation module generates a compensated signal by equalizing amplitudes of frequency components of the filtered signal in a compensation frequency range to reduce inter-symbol interference in the filtered signal. The slicer module determines logic states of serial data in the compensated signal and generates an output serial data signal including serial data having the determined logic states.

17 Claims, 5 Drawing Sheets

ADAPTIVE DECISION FEEDBACK EQUALIZER FOR HIGH DATA RATE SERIAL LINK RECEIVER

BACKGROUND

Serial communication systems typically transmit data from a transmitter to a receiver through a band-limited communication channel. At sufficiently high data rates, inter-symbol interference occurs in the communication channel and causes distortion in the data received by the receiver. Generally, inter-symbol interference increases as the data rate increases and as the length of the communication channel increases.

In some applications, a serial communication system requires both a high data rate and a long communication channel. In these applications, distortion in the data caused by inter-symbol interference may limit the date rate of the serial communication system. Consequently, the communication system may not operate the desired high data rate.

In light of the above, a need exists for an improved adaptive decision feedback equalizer. A further need exits for a communication system that operates at a high data rate over a long communication channel.

SUMMARY

An adaptive decision feedback equalizer, in accordance with one embodiment, includes a filter module, a compensation module, and a slicer module. The filter module generates a filtered signal by filtering an input serial data signal to reduce inter-symbol interference in the input serial data signal. The compensation module generates a compensated signal by equalizing amplitudes of frequency components of the filtered signal in a compensation frequency range. In this way, the compensation module increases a compensation frequency range of the adaptive decision feedback equalizer and further reduces inter-symbol interference. The slicer module determines logic states of serial data in the compensated signal and generates an output serial data signal including serial data having the determined logic states.

Increasing the compensation frequency range allows the adaptive decision feedback equalizer to compensate for higher losses in the input serial data signal, which enhances (e.g., increases) the reduction of inter-symbol interference in the input serial data signal. Consequently, the adaptive decision feedback equalizer may generate an output serial data signal for an input serial data signal transmitted over a longer communication channel or having a higher data rate, or both.

A receiver, in accordance with one embodiment, includes an adaptive decision feedback equalizer and a deserializer. The adaptive decision feedback equalizer includes a filter module, a compensation module, and a slicer module. The filter module is configured to generate a filtered signal by reducing inter-symbol interference in the first serial data signal. The compensation module is configured to generate a compensated signal by equalizing amplitudes of frequency components of the filtered signal in a compensation frequency range to reduce inter-symbol interference in the filtered signal. The slicer module is configured to generate a second serial data signal by determining at least one logic state of the compensated signal. The deserializer is configured to generate a parallel data signal comprising parallel data by converting serial data of the second serial data signal to the parallel data.

An adaptive equalizer, in accordance with one embodiment, includes a filter module, a compensation module, and a slicer module. The filter module is configured to generate a filtered signal by reducing inter-symbol interference in the first serial data signal. The compensation module is configured to generate a compensated signal by equalizing amplitudes of frequency components of the filtered signal in a compensation frequency range to reduce inter-symbol interference in the filtered signal. The slicer module is configured to generate a second serial data signal by determining at least one logic state of the compensated signal.

A method of reducing inter-symbol interference in a serial data signal, in accordance with one embodiment, includes generating a filtered signal by filtering a first serial data to reduce inter-symbol interference in the first serial data signal. The method also includes generating a compensated signal by equalizing frequency components of the filtered signal in a compensation frequency range to reduce inter-symbol interference in the filtered signal. Additionally, the method includes generating a second serial data signal by determining at least one logic state of the compensated signal.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

In various embodiments, an adaptive decision feedback equalizer reduces inter-symbol interference in a serial data signal by filtering the serial data signal and selectively adjusting amplitudes of frequency components of the filtered signal in a compensation frequency range.

Figure 1:
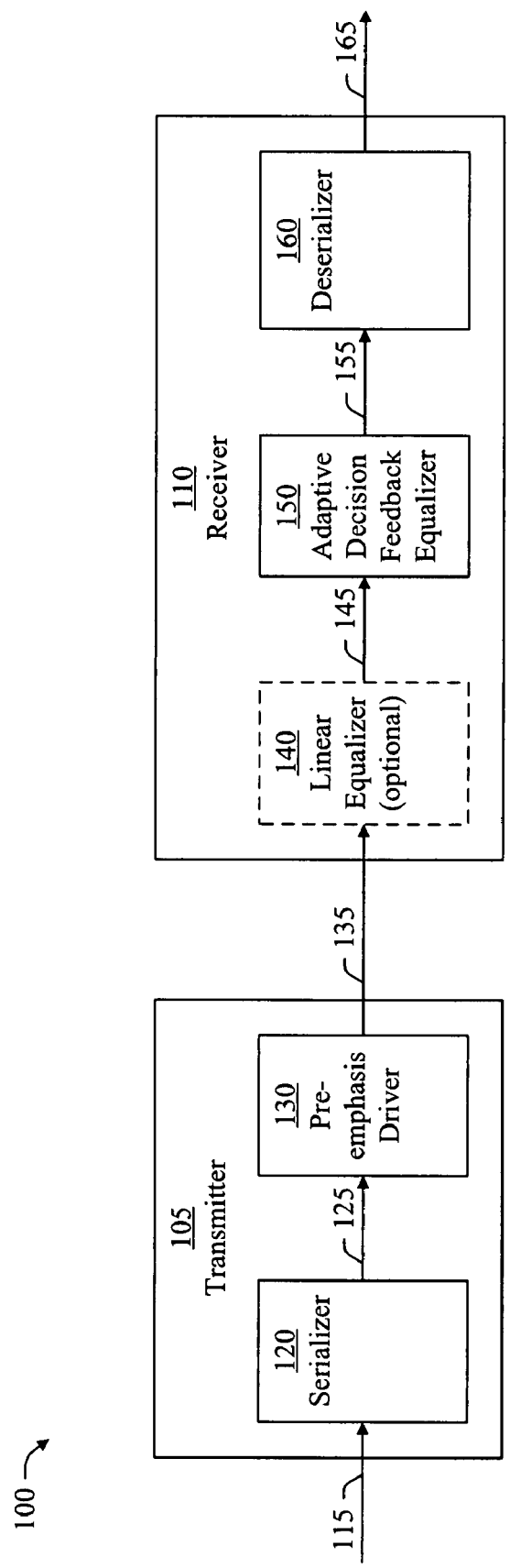
FIG. 1 is a block diagram of communication system, in accordance with an embodiment of the present invention.

FIG. 1 illustrates a communication system 100, in accordance with an embodiment of the present invention. The communication system 100 includes a transmitter 105 and a receiver 110. The transmitter 105 includes a serializer 120 and a pre-emphasis driver 130 coupled to the serializer 120. The serializer 120 receives a parallel data signal 115 and generates a serial data signal 125 by serializing the parallel data signal 115. In this way, the serializer 120 converts parallel data (e.g., symbols) in the parallel data signal 115 to serial data (e.g., symbols) in the serial data signal 125. The pre-emphasis driver 130 generates the serial data signal 135 by pre-emphasizing the serial data signal 125 and transmits the serial data signal 135 to the receiver 110 through a communication channel. By pre-emphasizing the serial data signal 125, the pre-emphasis driver 130 compensates for transmission losses occurring during transmission of the serial data signal 135 to the receiver 110. In various embodiments, the receiver 110 is a serial data link receiver, such as a high definition multimedia interface (HDMI) receiver, a peripheral component interconnect (PCI) Express receiver, or a Gen 2 receiver. In other embodiments, the receiver may be part of a communication system, such as a backplane communication system.

In one embodiment, the pre-emphasis driver 130 emphasizes the amplitude of the serial data signal 125 at transitions between logic states to compensate for losses of amplitude occurring during transmission of the serial data signal 135. In another embodiment, the pre-emphasis driver 130 emphasizes selected frequency components of the serial data signal 125 to compensate for changes in frequency bandwidth that occur during transmission of the serial data signal 135.

The receiver 110 includes a adaptive decision feedback equalizer 150 and a deserializer 160 coupled to the adaptive decision feedback equalizer 150. In some embodiments, the receiver 110 includes an optional linear equalizer 140 coupled to the adaptive decision feedback equalizer 150. In these embodiments, the linear equalizer 140 receives the serial data signal 135 generates a serial data signal 145 for the adaptive decision feedback equalizer 150 by equalizing frequency components of the serial data signal 135. The linear equalizer 140 equalizes the frequency components of the serial data signal 135 by amplifying higher frequency components, attenuating lower frequency components, or both. In this way, the linear equalizer 140 compensates for transmission losses occurring during transmission of the serial data signal 135 and reduces inter-symbol interference (ISI) in the serial data signal 135. The linear equalizer 140 provides the serial data signal 145 to the adaptive decision feedback equalizer 150. In embodiments without the linear equalizer 140, the adaptive decision feedback equalizer 150 receives the serial data signal 135 as the serial data signal 145.

The adaptive decision feedback equalizer 150 equalizes the serial data signal 145 by using an adaptive filtering technique. In this way, the adaptive decision feedback equalizer 150 compensates for loss in the serial data signal 145 which reduces inter-symbol interference in the serial data signal 145. In embodiments including the linear equalizer 140, the linear equalizer 140 reduces inter-symbol interference in the serial data signal 135 and adaptive decision feedback equalizer 150 reduces inter-symbol interference in the serial data signal 145.

Additionally, the adaptive decision feedback equalizer 150 determines logic states of serial data in the serial data signal 145 after reducing inter-symbol interference in the serial data signal 145. Further, the adaptive decision feedback equalizer 150 generates a serial data signal 155 including serial data representing the determined logic states. The deserializer 160 generates a parallel data signal 165 including parallel data by deserializing the serial data in the serial data signal 155. In this way, the deserializer 160 converts the serial data in the serial data signal 155 to the parallel data in the parallel data signal 165.

Figure 2:
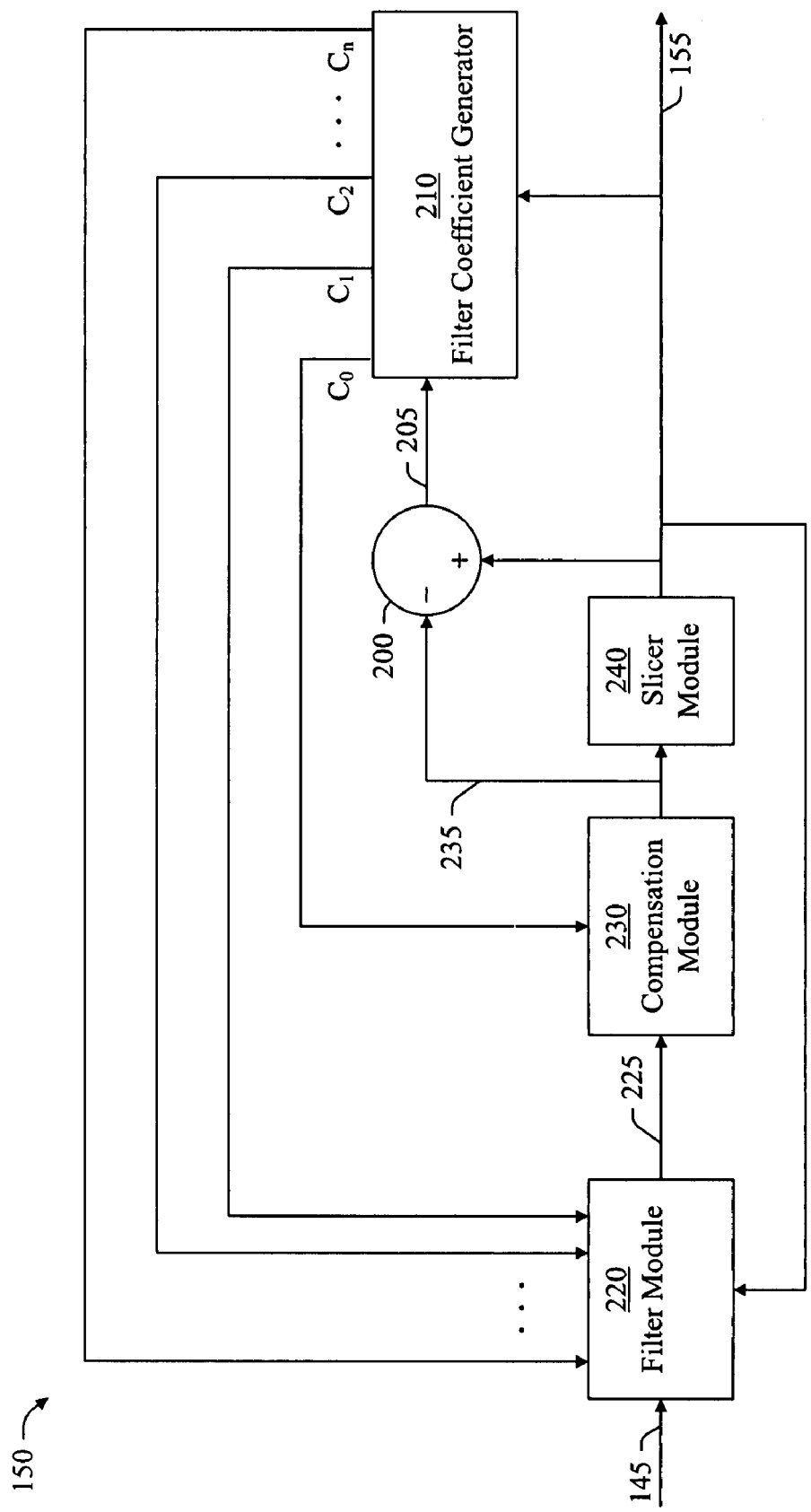
FIG. 2 is a block diagram of a adaptive decision feedback equalizer, in accordance with an embodiment of the present invention.

FIG. 2 illustrates the adaptive decision feedback equalizer 150, in accordance with an embodiment of the present invention. The adaptive decision feedback equalizer 150 includes an error module 200, a filter coefficient generator 210, a filter module 220, a compensation module 230, and a slicer module 240. The error module 200 is coupled to the compensation module 230, the slicer module 240, and the filter coefficient generator 210. The filter coefficient generator 210 is coupled to the filter module 220 and the slicer module 240. The filter module 220 is coupled to the compensation module 230 and the slicer module 240. Additionally, the compensation module 230 is coupled to the slicer module 240.

The error module 200 generates an error signal 205 based on the serial data signal 145. In the embodiment of FIG. 2, the error module 200 generates the error signal 205 by subtracting a compensated signal 235 generated by the compensation module 230 from the serial data signal 155. In this embodiment, the error signal 205 is a feedback signal representing a difference between the compensated signal 235 and the serial data signal 155.

The filter coefficient generator 210 generates filter coefficients $C_0$-$C_n$, based on the serial data signal 155 and the error signal 205. In various embodiments, the filter coefficient $C_0$ is a compensation coefficient and the filter coefficients $C_1$-$C_n$, are tap coefficients. The filter coefficient generator 210 adjusts the filter coefficients $C_0$-$C_n$, in response to changes in the error signal 205 and the serial data signal 155 to reduce differences between the compensated signal 235 and the serial data signal 155. In this way, the filter coefficient generator 210 adapts the filter coefficients $C_0$-$C_n$. In one embodiment, the filter coefficient generator 210 computes the filter coefficients $C_0$-$C_n$, by using a least mean square (LMS) algorithm.

The filter module 220 generates a filtered signal 225 by filtering the serial data signal 145 based on the tap coefficients $C_0$-$C_n$, to reduce inter-symbol interference in the serial data signal 145. In this way, the filter module 220 compensates for losses of the serial data signal 145 in a compensation frequency range of the filter module 220. In turn, the compensation module 230 equalizes frequency components of the filtered signal 225 in a compensation frequency range of the compensation module 230 to compensate for losses in the serial data signal 145. In this way, the compensation module 230 increases a compensation frequency range of the adaptive decision feedback equalizer 150 which includes the compensation frequency range of the filter module 220 and the compensation frequency range of the compensation module 230.

In some embodiments, the compensation frequency range of the compensation module 230 encompasses the compensation frequency range of the filter module 220. In other embodiments, the compensation frequency range of the compensation module 230 overlaps with the compensation frequency range of the filter module 220. In one embodiment, the compensation frequency range of the adaptive decision feedback equalizer 150 is greater than 10 dB. In other embodiments, the compensation frequency range of the adaptive decision feedback equalizer 150 is greater than 20 dB.

Generally, the compensation module 230 increases a range of frequencies for which the adaptive decision feedback equalizer 150 compensates for loss in the serial data signal 145. Because the adaptive decision feedback equalizer 150 compensates for loss in the serial data signal 145 over a larger frequency range, inter-symbol interference in the serial data signal 145 is reduced to a greater degree. Consequently, the adaptive decision feedback equalizer 150 may generate the serial data signal 155 despite an elevated level of inter-symbol interference in the serial data signal 145. For example, the inter-symbol interference in the serial data signal 145 may be elevated because of an increased data rate of the serial data signal 145 or because the serial data signal 145 has been transmitted through a longer communication channel, or both.

Figure 3:
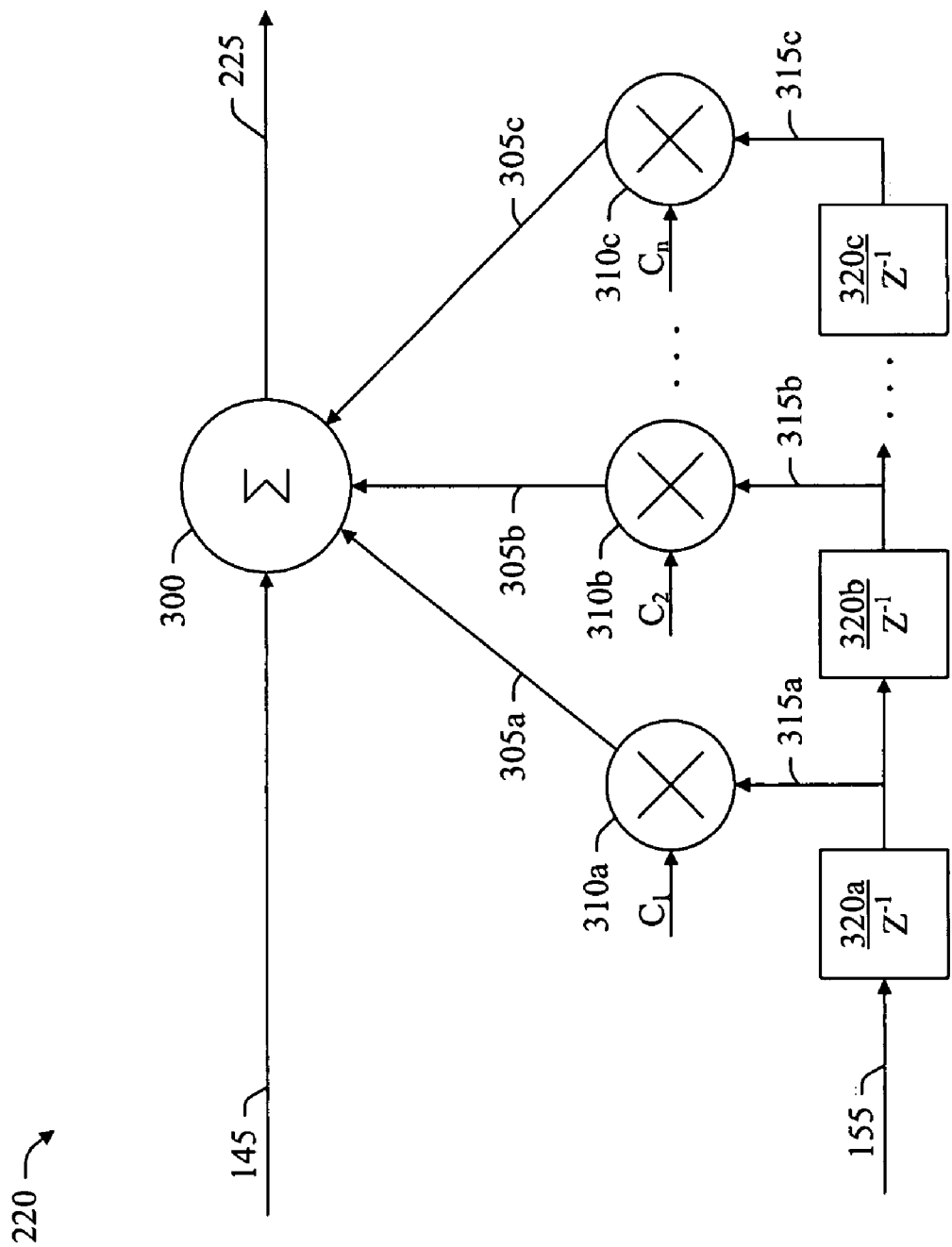
FIG. 3 is a block diagram of a filter module, in accordance with an embodiment of the present invention.

FIG. 3 illustrates the filter module 220, in accordance with an embodiment of the present invention. The filter module 220 includes a summation module 300, multipliers 310, and a sequence of tap modules 320. Each of the multipliers 310 is coupled to the summation module 300. Additionally, each of the tap modules 320 is coupled to a corresponding multiplier 310. Although three multipliers 310 (e.g., multipliers 310a-c) and three tap modules 320 (e.g., tap modules 320a-c) are illustrated in FIG. 3, the filter module 220 may have more or fewer than three multipliers 310 and more or fewer than three tap modules 320 in other embodiments.

Each tap module 320 generates a tap signal 315 based on an input signal to the tap module 320. As may be envisioned from FIG. 3, each tap module 320 in the sequence of tap modules 320 receives the tap signal 315 generated by the previous tap module 320 in the sequence as an input signal, except for the first tap module 320 which receives the serial data signal 155 as an input signal. In various embodiments, each tap module 320 generates a tap signal 315 based on the input signal of the tap module 320 by mapping the input signal to the tap signal 315 according to a transfer function $Z^{-1}$. In this way, the tap modules 320 map the serial data signal 155 to corresponding tap signals 315 according to a transfer function $Z^{-n}$, where n is the number of the tap module 320 in the sequence of tap modules 320. For example, the tap module 320a receives the serial data signal 155 as the input signal of the tap module 320a and maps the serial data signal 155 to the tap signal 315a according to the transfer function $Z^{-1}$. As another example, the tap module 320b receives the tap signal 315a as the input signal of the tap module 320b and maps the tap signal 315a to the tap signal 315b according to the transfer function $Z^{-1}$. In this way, the tap module 320b maps the serial data signal 155 to the tap signal 315b according to the transfer function $Z^{-2}$.

Each of the multipliers 310 generates a component signal 305 by multiplying a corresponding tap signal 315 received by the multiplier 310 by a corresponding tap coefficient received by the multiplier 310. As illustrated in FIG. 3, the multiplier 310a generates the component signal 305a by multiplying the tap signal 315a by the tap coefficient $C_1$. The component signal 305a represents the serial data signal 155 mapped by a transfer function $C_1 Z^{-1}$. The multiplier 310b generates the component signal 305b by multiplying the tap signal 315b by the tap coefficient $C_2$. The component signal 305b represents the serial data signal 155 mapped by a transfer function $C_2 Z^{-2}$. The multiplier 310c generates the component signal 305c by multiplying the tap signal 315c by the tap coefficient $C_n$. The component signal 305c represents the serial data signal 155 mapped by a transfer function $C_n Z^{-n}$.

The summation module 300 generates the filtered signal 225 based on the component signals 305. In one embodiment, the summation module 300 generates the filtered signal 225 by summing the serial data signal 145 and the component signals 305. In this way, the summation module 300 compensates for losses of the serial data signal 145 in the compensation frequency range of the filter module 220. In various embodiments, the filter module 220 generates the filtered signal 225 by mapping the serial data signal 145 to the filtered signal 225 according to a transfer function $H_1(z)$ expressed as follows:

$$H_1(z) = 1/[1 - (C_1 Z_{-1} + C_2 Z^{-2} + \ldots + CnZ^{-n})]$$

Figure 4:
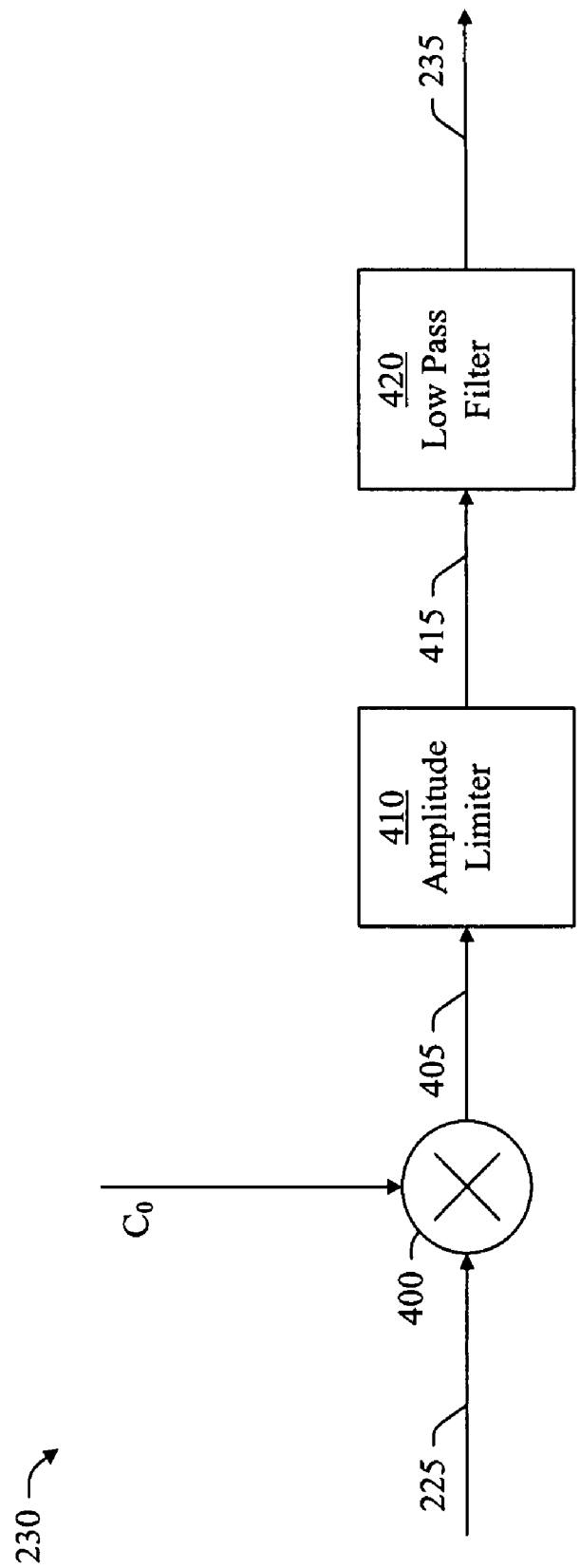
FIG. 4 is a block diagram of a compensation module, in accordance with an embodiment of the present invention.

FIG. 4 illustrates the compensation module 230, in accordance with an embodiment of the present invention. The compensation module 230 includes an amplifier 400, an amplitude limiter 410, and a low pass filter 420. The amplitude limiter 410 is coupled to the amplifier 400 and the low pass filter 420. The amplifier 400 generates an amplified signal 405 by amplifying the filtered signal 225 based on the compensation coefficient $C_0$. For example, the amplifier 400 may be a linear amplifier having a gain controlled by the compensation coefficient $C_0$. Because of bandwidth limitations of the amplifier 400, the frequency response of the amplifier 400 may vary over a frequency range which causes amplitudes of frequency components of the amplified signal 405 to vary over the frequency range.

The amplitude limiter 410 generates an amplitude limited signal 415 by limiting frequency components of the amplified signal 405 having higher amplitudes than other frequency components of the amplified signal 405. In various embodiments, the amplitude limiter 410 limits frequency components of the amplified signal 405 in a compensation frequency range by reducing (e.g., attenuating) amplitudes of those frequency components. In this way, the amplitude limiter 410 establishes the compensation frequency range and equalizes amplitudes of the frequency components in the amplitude limited signal 415.

The low pass filter 420 generates the compensated signal 235 by filtering out higher frequency components from the amplitude limited signal 415. In one embodiment, the low pass filter 420 filters out higher frequency components from the amplitude limited signal 415 by reducing (e.g., attenuating) amplitudes of frequency components having frequencies above the compensation frequency range. In this way, the low pass filter 420 reduces noise in the amplitude limited signal 415.

In various embodiments, the compensation frequency range of the compensation module 230 encompasses the frequency range of the filter module 220 or overlaps with the frequency range of the filter module 220, or both. In this way, the compensation module 230 increases the compensation frequency range of the adaptive decision feedback equalizer 150. Moreover, the adaptive decision feedback equalizer 150 compensates for losses of the serial data signal 145 over this increased compensation frequency range which enhances (e.g., increases) the reduction of inter-symbol interference in the serial data signal 145. Consequently, the adaptive decision feedback equalizer 150 may generate the serial data signal 155 for an input serial signal (e.g., serial data signal 145) having higher loss as a result of being transmitted over a longer communication channel or having a higher data rate, or both.

In various embodiments, the filter module 220 in combination with the compensation module 230 generate the compensated signal 235 by mapping the serial data signal 145 to the compensated signal 235 according to a transfer function $H_2(z)$ expressed as follows:

$$H_2(z) = 1/[(1/C_0) - (C_1 Z_{-1} + C_2 Z^{-2} + \ldots + CnZ^{-n})]$$

In effect, the compensation module 230 modifies the transfer function $H_1(z)$ to the transfer function $H_2(z)$ by replacing the constant 1 in the denominator of the transfer function $H_1(z)$ to the term $1/C_0$. The term $1/C_0$ is an additional freedom factor of the transfer function $H_2(z)$ that is adjustable by the filter coefficient generator 210 to increase the compensation frequency range of the adaptive decision feedback equalizer 150. Moreover, the inclusion of the term $1/C_0$ in the transfer function $H_2(z)$ provides a greater degree of stability and convergence in the adaptive decision feedback equalizer 150 in contrast to adding an additional tap to the transfer function $H_1(z)$ or increasing values of the tap coefficients $C_i$-$C_n$. Consequently, the decision error rate of the adaptive decision feedback equalizer 150 is reduced with the inclusion of the term $1/C_0$ in the transfer function $H_2(z)$.

In one embodiment, the value of the compensation coefficient $C_0$ is approximately equal to 4 during normal operation of the adaptive decision feedback equalizer 150 (e.g., after the adaptive decision feedback equalizer 150 is locked). In a further embodiment, the value of the tap coefficient $C_1$ is approximately equal to 0.22, which provides a compensation frequency range of approximately 24 dB in the compensation module 230.

In one embodiment, the adaptive decision feedback equalizer 150 compensates for a −22 dB loss in the serial data signal 145. In other embodiments, the adaptive decision feedback equalizer 150 compensates for losses in the serial data signal 145 that are less than or greater than −10 dB. In some embodiments, the adaptive decision feedback equalizer 150 compensates for losses in the serial data signal 145 that are greater than −20 dB.

Figure 5:
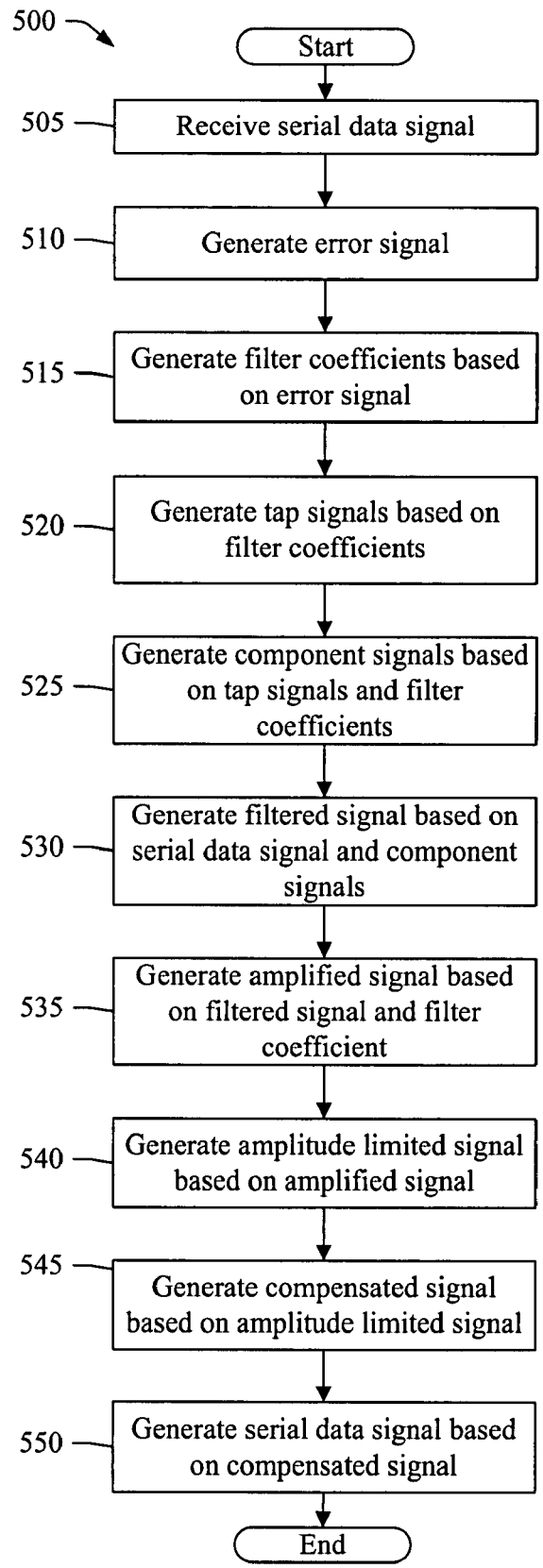
FIG. 5 is a flow chart for a method of reducing inter-symbol interference in a serial data signal, in accordance with an embodiment of the present invention.

FIG. 5 illustrates a method 500 of reducing inter-symbol interference in a serial data signal, in accordance with an embodiment of the present invention. In step 505, a serial data signal 145 (e.g., an input serial data signal) is received. In various embodiments, the adaptive decision feedback equalizer 150 receives the serial data signal 145. The method 500 then proceeds to step 510.

In step 510, an error signal 205 is generated. In various embodiments, the error module 200 generates the error signal 205 by subtracting the compensated signal 235 from the serial data signal 155 (e.g., an output serial data signal). The method 500 then proceeds to step 515.

In step 515, filter coefficients are generated based on the error signal 205. In various embodiments, the filter coefficient generator 210 generates the filter coefficients $C_0$-$C_n$ based on the error signal 205 and the serial data signal 155. In one embodiment, the filter coefficient generator 210 computes the filter coefficients by using a least mean square algorithm. The method 500 then proceeds to step 520.

In step 520, the tap signals 315 are generated based on the filter coefficients $C_0$-$C_n$. In one embodiment, each tap module 320 generates a tap signal 315 based on an input signal of the tap module 320 by mapping the input signal to the tap signal 315 according to a transfer function $Z^{-1}$. In this embodiment, the input signal to the first tap module 320 in the sequence of tap modules 320 is the serial data signal 155 and the input signal to each remaining tap module 320 is the tap signal 315 generated by the previous tap module 320 in the sequence of tap modules 320. In this way, the tap modules 320 map the serial data signal 155 to corresponding tap signals 315 according to a transfer function $Z^{-n}$, where n is the number of the tap module 320 in the sequence. The method 500 then proceeds to step 525.

In step 525, the component signals 305 are generated based on the tap signals 315 and the filter coefficients. In various embodiments, each multiplier 310 generates a tap signal 315 by multiplying a tap signal 315 received by the multiplier 310 by a filter coefficient (e.g., one of the filter coefficients $C_1$-$C_n$) received by the multiplier 310. The method 500 then proceeds to step 530.

In step 530, the filtered signal 225 is generated based on the serial data signal 145 and the component signals 305. In various embodiments, the summation module 300 generates the filtered signal 225 by summing the serial data signal 145 and the components signals 305. The method 500 then proceeds to step 535.

In step 535, the amplified signal 405 is generated based on the filtered signal 225 and a filter coefficient (e.g., one of the filter coefficients $C_0$-$C_n$). In various embodiments, the amplifier 400 generates the amplified signal 405 by amplifying the filtered signal 225 by the filter coefficient $C_0$ (e.g., the compensation coefficient $C_0$). In this embodiment, the gain of the amplifier 400 is determined by the compensation coefficient $C_0$. For example, the amplifier 400 may be a linear amplifier having a gain of $C_0$. The method 500 then proceeds to step 540.

In step 540, the amplitude limited signal 415 is generated based on the amplified signal 405. In one embodiment, the amplitude limiter 410 generates the amplitude limited signal 415 by selectively reducing amplitudes of higher frequency components of the amplified signal 405 in a compensation frequency range of the compensation module 230. In this way, the amplitude limiter 410 equalizes amplitudes of frequency components of the amplified signal 405 in the compensation frequency range of the compensation module 230. The method 500 then proceeds to step 545.

In step 545, the compensated signal 235 is generated based on the amplitude limited signal 415. In one embodiment, the low pass filter 420 generates the compensated signal 235 by reducing amplitudes of frequency components of the amplitude limited signal 415 having frequencies above the compensation frequency range of the adaptive decision feedback equalizer 150. In this way, the low pass filter 420 reduces noise in the amplitude limited signal 415. The method 500 then proceeds to step 550.

In step 550, the serial data signal 155 is generated based on the compensated signal 235. In one embodiment, the slicer module 240 generates the serial data signal 155 by determining logic states of serial data in the compensated signal 235 and generating the serial data signal 155 including serial data representing the logic states. The method 500 the ends.

In some embodiments, the step 505-550 may be performed in a different order than that described herein and illustrated in FIG. 5. In various embodiments, the method 500 may include more or fewer than steps 505-550. In some embodiments, two or more of the steps 505-550 may be performed in parallel or substantially simultaneously.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A receiver comprising:
   an adaptive decision feedback equalizer comprising:
      a filter module configured to receive a first serial data signal and to generate a filtered signal by reducing inter-symbol interference in the first serial data signal;
      a compensation module configured to generate a compensated signal comprising serial data by equalizing amplitudes of frequency components of the filtered signal in a compensation frequency range to reduce inter-symbol interference in the filtered signal, the compensation module including:
         an amplifier configured to generate an amplified signal by amplifying the filtered signal;
         an amplitude limiter configured to generate an amplitude limited signal by limiting amplitudes of frequency components of the amplified signal in the compensation frequency range; and
         a low pass filter configured to generate the compensated signal by reducing frequency components of the amplitude limited signal having frequencies above the compensation frequency range; and
      a slicer module configured to generate a second serial data signal by determining at least one logic state of the compensated signal; and
   a deserializer configured to generate a parallel data signal comprising parallel data by converting serial data of the second serial data signal to the parallel data.

2. The receiver of claim 1, wherein the adaptive decision feedback equalizer further comprises:

an error module configured to generate an error signal by subtracting the compensated signal from the second serial data signal; and a coefficient generator configured to compute a plurality of filter coefficients based on the error signal and the second serial data signal, the plurality of filter coefficients comprising a plurality of tap coefficients and a compensation coefficient, wherein the filter module is further configured to generate the filtered signal by filtering the first serial data signal based on the plurality of tap coefficients and wherein the amplifier is further configured to generate the amplified signal based on the compensation coefficient.

3. The receiver of claim 2, wherein the coefficient generator computes the plurality of filter coefficients by performing a least mean square algorithm on the second serial data signal and the error signal.

4. The receiver of claim 2, wherein the filter module comprises:
a plurality of tap modules configured to generate a plurality of tap signals based on the second serial data signal;
a plurality of multipliers configured to generate a plurality of component signals by multiplying each tap signal of the plurality of taps signals by a corresponding tap coefficient of the plurality of tap coefficients; and
a summation module configured to generate the filtered signal by summing the plurality of component signals and the first serial data signal.

5. The receiver of claim 1, further comprising a linear equalizer configured to receive a third serial data signal and to generate the first serial data signal by equalizing the third serial data signal.

6. The receiver of claim 1, wherein the compensation frequency range is greater than ten decibels.

7. The receiver of claim 1, wherein the compensation frequency range is greater than twenty decibels.

8. An adaptive decision feedback equalizer comprising:
a filter module configured to generate a filtered signal by reducing inter-symbol interference in a first serial data signal;
a compensation module configured to generate a compensated signal comprising serial data by equalizing amplitudes of frequency components of the filtered signal in a compensation frequency range to reduce inter-symbol interference in the filtered signal, the compensation module including:
an amplifier configured to generate an amplified signal by amplifying the filtered signal;
an amplitude limiter configured to generate an amplitude limited signal by limiting amplitudes of frequency components of the amplified signal in the compensation frequency range; and
a low pass filter configured to generate the compensated signal by reducing frequency components of the amplitude limited signal having frequencies above the compensation frequency range; and
a slicer module configured to generate a second serial data signal comprising serial data by determining at least one logic state of the compensated signal.

9. The adaptive decision feedback equalizer of claim 8, further comprising:
an error module configured to generate an error signal by subtracting the compensated signal from the second serial data signal; and
a coefficient generator configured to compute a plurality of filter coefficients based on the error signal and the second serial data signal, the plurality of filter coefficients comprising a plurality of tap coefficients and a compensation coefficient, wherein the filter module is further configured to generate the filtered signal by filtering the first serial data signal based on the plurality of tap coefficients and wherein the amplifier is further configured to generate the amplified signal based on the compensation coefficient.

10. The adaptive decision feedback equalizer of claim 9, wherein the coefficient generator computes the plurality of filter coefficients by performing a least mean square algorithm on the second serial data signal and the error signal.

11. The adaptive decision feedback equalizer of claim 9, wherein the filter module comprises:
a plurality of tap modules configured to generate a plurality of tap signals based on the second serial data signal;
a plurality of multipliers configured to generate a plurality of component signals by multiplying each tap signal of the plurality of taps signals by a corresponding tap coefficient of the plurality of tap coefficients; and
a summation module configured to generate the filtered signal by summing the plurality of component signals and the first serial data signal.

12. The adaptive equalizer of claim 8, wherein the compensation frequency range is greater than ten decibels.

13. The adaptive equalizer of claim 8, wherein the compensation frequency range is greater than twenty decibels.

14. A method of equalizing a signal, comprising:
generating a filtered signal by filtering a first serial data signal to reduce inter-symbol interference in the first serial data signal;
generating a compensated signal by equalizing frequency components of the filtered signal in a compensation frequency range to reduce inter-symbol interference in the filtered signal, the generating a compensated signal including:
generating an amplified signal by amplifying the filtered signal;
generating an amplitude limited signal by limiting amplitudes of frequency components of the amplified signal in the compensation frequency range; and
reducing frequency components of the amplitude limited signal having frequencies above the compensation frequency range; and
generating a second serial data signal by determining at least one logic state of the compensated signal.

15. The method of claim 14, further comprising:
generating an error signal by subtracting the compensated signal from the second serial data signal; and
generating a plurality of filter coefficients based on the error signal and the second serial data signal, the plurality of filter coefficients comprising a plurality of tap coefficients and a compensation coefficient, wherein generating the filtered signal comprises filtering the first serial data signal based on the plurality of tap coefficients and wherein generating the amplified signal comprises multiplying the filtered signal by the compensation coefficient.

16. The method of claim 14, wherein generating the plurality of filter coefficients comprises computing the plurality of filter coefficients by performing a least mean square algorithm on the second serial data signal and the error signal.

17. The method of claim 14, wherein the compensation frequency range is greater than twenty decibels.

* * * * *